(12) United States Patent
Miessbacher et al.

(10) Patent No.: US 8,471,173 B2
(45) Date of Patent: Jun. 25, 2013

(54) LASER HYBRID WELDING METHOD AND LASER HYBRID WELDING TORCH USING A ZINC AND/OR CARBON AND/OR ALUMINUM-CONTAINING ROD

(75) Inventors: Gerhard Miessbacher, Weisskirchen (AT); Manfred Rührnössl, Linz (AT)

(73) Assignee: Fronius International GmbH, Pettenbach (AT)

( * ) Notice: Subject to any disclaimer, the term of this patent is extended or adjusted under 35 U.S.C. 154(b) by 1430 days.

(21) Appl. No.: 11/596,048

(22) PCT Filed: May 9, 2005

(86) PCT No.: PCT/AT2005/000156
§ 371 (c)(1),
(2), (4) Date: Nov. 9, 2006

(87) PCT Pub. No.: WO2005/107996
PCT Pub. Date: Nov. 17, 2005

(65) Prior Publication Data
US 2007/0251927 A1    Nov. 1, 2007

(30) Foreign Application Priority Data
May 10, 2004    (AT) .................................. A 802/2004

(51) Int. Cl.
*B23K 26/24*    (2006.01)
(52) U.S. Cl.
USPC ............. 219/121.63; 219/121.64; 219/137 R; 219/136

(58) Field of Classification Search
USPC ................... 219/121.64, 121.84, 136, 137 R, 219/137.2, 137 MW
See application file for complete search history.

(56) References Cited

U.S. PATENT DOCUMENTS 3,431,091 A * 3/1969 Soulary ......................... 428/659
4,507,540 A * 3/1985 Hamasaki ................ 219/121.64
(Continued)

FOREIGN PATENT DOCUMENTS

DE         10151257 A1     5/2003
GB         2274257 A   *   7/1994
(Continued)

OTHER PUBLICATIONS

Englhard, Welding and/or cutting device, Oct. 16, 1997, WO 97/37808 A1, Machine Assisted English Translation of "Description".*

(Continued)

*Primary Examiner* — Henry Yuen
*Assistant Examiner* — Thien S Tran
(74) *Attorney, Agent, or Firm* — Collard & Roe, P.C.

(57) ABSTRACT

The invention relates to a method for welding coated sheet metal (3), which comprises at least one laser (13) and at least one shielded arc unit (5) and a rod feeding device (11) for a welding rod (12). The aim of the invention is to provide a method or a device of the aforementioned kind which allows fo~ reducing or completely avoiding inclusions such as are e.g. caused by the evaporation of the coating of the metal sheet (3). For this purpose, a clamping device (6) is used for positioning the coated metal sheet (3) without substantial gaps between the individual sheets. A material having a zinc and/or carbon and/or aluminum content is used as the weld metal or welding rod (12).

21 Claims, 5 Drawing Sheets

U.S. PATENT DOCUMENTS

| | | | |
|---|---|---|---|
| 5,767,479 A * | 6/1998 | Kanaoka | 219/121.61 |
| 6,469,277 B1 * | 10/2002 | Trube et al. | 219/137 R |
| 6,914,213 B2 | 7/2005 | Alips et al. | |
| 7,015,417 B2 * | 3/2006 | Takikawa et al. | 219/121.64 |
| 7,154,065 B2 * | 12/2006 | Martukanitz et al. | 219/121.64 |
| 2001/0047984 A1 | 12/2001 | Briand et al. | |
| 2001/0050273 A1 * | 12/2001 | Lefebvre et al. | 219/137 R |
| 2001/0052511 A1 | 12/2001 | Briand et al. | |
| 2002/0008094 A1 | 1/2002 | Briand et al. | |
| 2003/0136768 A1 | 7/2003 | Sonoda et al. | |
| 2003/0173343 A1 | 9/2003 | Matile et al. | |
| 2004/0016788 A1 * | 1/2004 | Huismann et al. | 226/115 |
| 2004/0173587 A1 * | 9/2004 | Musselman | 219/121.64 |

FOREIGN PATENT DOCUMENTS

| | | | | |
|---|---|---|---|---|
| JP | 60121093 A | | | 6/1985 |
| JP | 10034379 A | | | 2/1998 |
| JP | 10272577 A | * | | 10/1998 |
| JP | 2002/160082 A | | | 6/2002 |
| JP | 2002346777 A | * | | 12/2002 |
| JP | 2003025081 A | * | | 1/2003 |
| JP | 2004 223548 A | | | 8/2004 |
| JP | 2004223543 A | * | | 8/2004 |
| WO | WO 97/37808 A | | | 10/1997 |
| WO | WO0064620 | | * | 4/2000 |
| WO | WO 01/17722 A | | | 3/2001 |
| WO | WO 03024658 A1 | * | | 3/2003 |
| WO | WO 03/031111 | | | 4/2003 |

OTHER PUBLICATIONS

Internet Article "Fülldrahtelektrode ohne Slacke für verzinkte Bleche", Jul. 1, 2003 http://ww.oerlikon.de/download/deutsch/fuelldrahtelektroden/metallunlegiert/safdual_zn.pdf (Abstract Enclosed).

International Search Report (Enclosed), Oct. 25, 2005.

"Welding Consumables Product Guide," Ari Liquide Welding Ltd, Mar. 1, 2006, Edition 1, Publication No. 901751-06, cover and p. 30.

SAFDUAL Zn—Flux-cored wire for zinking plates, www.catalogosaf-fro.com/prodotti/pdf/SAFDUAL%20Zn.pdf, May 23, 2006.

* cited by examiner

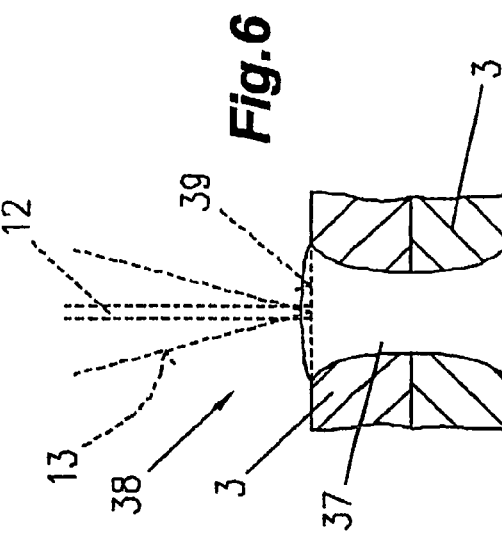
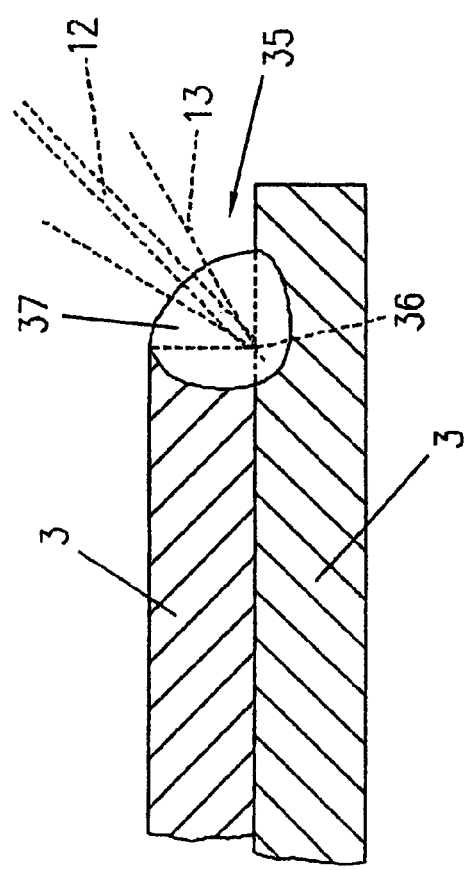
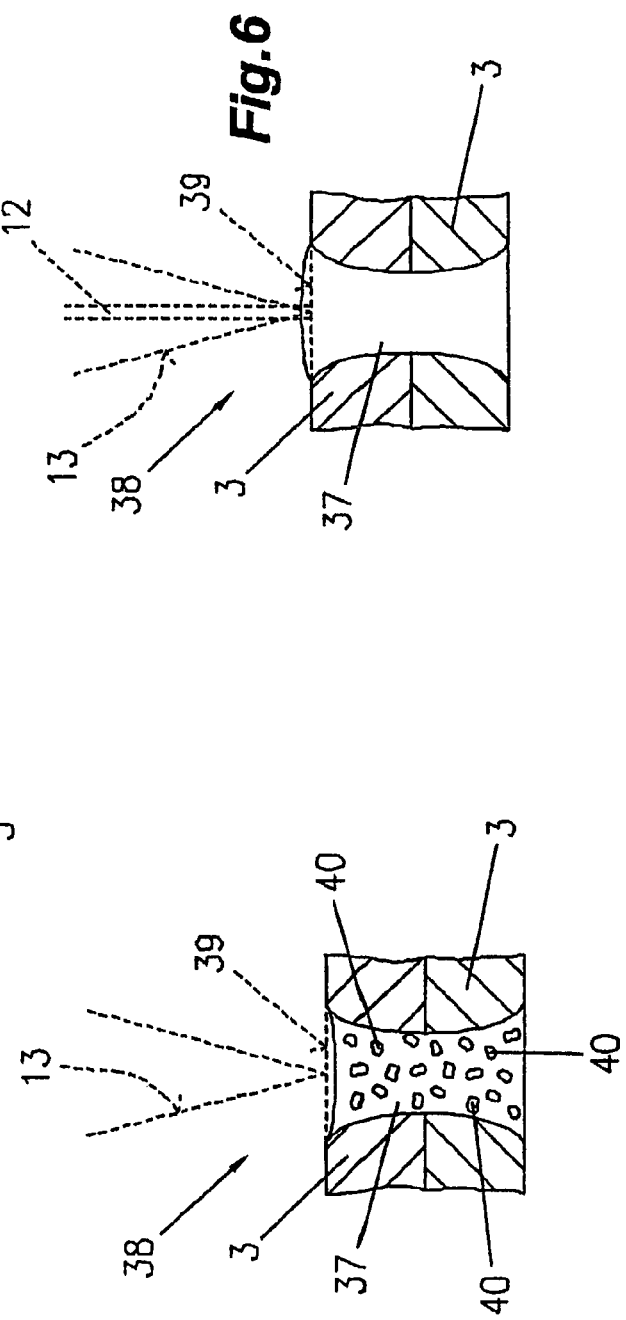

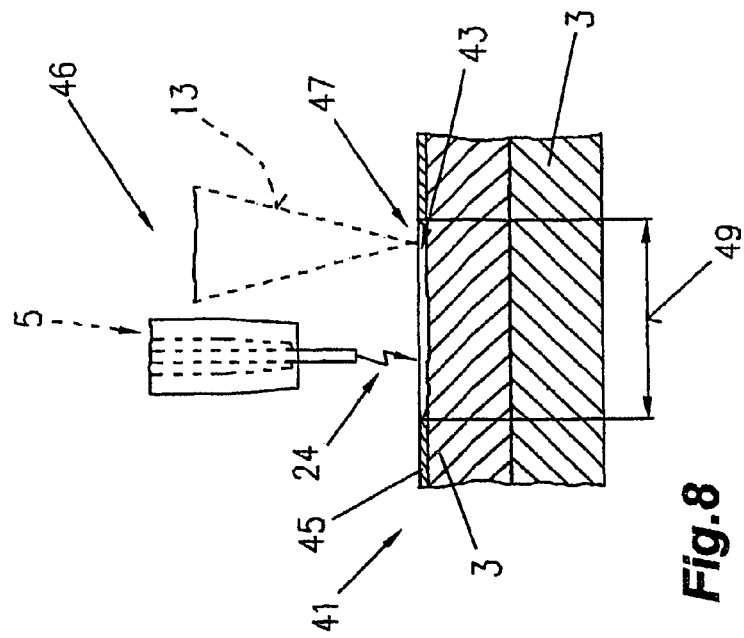
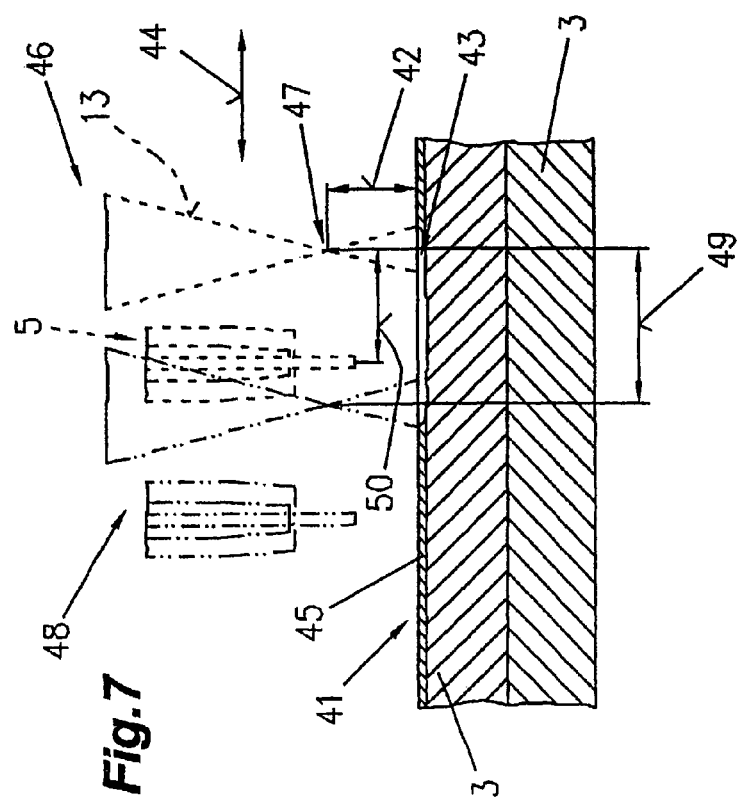

LASER HYBRID WELDING METHOD AND LASER HYBRID WELDING TORCH USING A ZINC AND/OR CARBON AND/OR ALUMINUM-CONTAINING ROD

CROSS REFERENCE TO RELATED APPLICATIONS

Applicants claim priority under 35 U.S.C. §119 of Austrian Application No. A802/2004 filed May 10, 2004. Applicants also claim priority under 35 U.S.C. §365 of PCT/AT2005/000156 filed May 9, 2005. The international application under PCT article 21(2) was not published in English

BACKGROUND OF THE INVENTION

1. Field of the Invention

The invention relates to a method for welding coated sheet metals using a laser hybrid welding process, wherein at least one laser process and one shielding gas welding process are carried out, with a filler material being supplied to the welding site via the shielding gas welding process.

Moreover, the invention relates to a method for starting a laser hybrid welding process for welding coated sheet metals, wherein at least one laser process and one shielding gas welding process are carried out with the laser process preceding the shielding gas welding process, and the shielding gas welding process is positioned in the vicinity of the laser, wherein a filler material is supplied to the welding site via the shielding gas welding process.

Furthermore, the invention relates to a laser hybrid welding torch for welding coated sheet metals or structural components, using a laser or laser optics and at least one shielding gas unit and a wire feeder for a filler material or welding wire.

2. Prior Art

Methods for welding coated sheet metals used, for instance, in the motorcar industry are already known.

DE 101 51 257 A1, for instance, describes a method for connecting clamped and positioned, loose car body parts of a vehicle body in a framing station, in which the body parts are welded by hybrid welding using at least one laser beam and at least one electric arc.

Combined laser electric-arc welding devices, so-called laser hybrid welding units, combine the advantages of a laser, like rapidness and a good heat input into the workpiece, with the advantages of conventional welding methods, e.g. MIG- (metal—inert gas) welding methods, like, for instance, a good gap bridging capacity. US 2001/050273 A1, US 2001/052511 A1, US 2001/047984 A1, US 2003/173343 A1 as well as US 2002/008094 A1, for instance, describe laser hybrid welding methods in which at least one laser process and one shielding gas welding process are carried out. Although it is pointed out that even coated workpieces can be welded together, the problems caused by the evaporation of the coating are not discussed, nor is any solution to overcome those problems suggested.

Basically, it is to be noted in connection with the methods known from the prior art that, in practice, these involve seam preparation operations providing gas evaporation gaps or gas exhalation spaces between the sheet metals in order to enable the escape of the gases forming during welding. Furthermore, weld seam finishing is usually carried out in practice in order to obtain tight weld seams, which means that manual rewelding is performed after the automated welding process in order to close the formed inclusions, craters or holes.

SUMMARY OF THE INVENTION

The object of the present invention, therefore, consists in providing a method for welding coated sheet metals, in which as few inclusions as possible, or none at all, are formed, which are caused, for instance, by an evaporation of the coating. An object of the invention also resides in providing the necessary stability and tightness to the weld seam. Another object of the invention resides in minimizing, or even eliminating, the time of preparation or pretreatment of the sheet metals to be welded so as to render any preliminary work for the weld seams super-fluous. Furthermore, an object of the invention consists in providing an improved ignition for a laser hybrid welding process. A further object of the invention resides in providing a welding process in which substantially less energy or heat is introduced into the workpiece and, in particular, sheet metals.

The object of the invention in method terms is achieved in that the coated sheet metals are positioned relative to each other in a substantially gap-free manner, i.e., with a gap of zero or almost zero between the sheet metals, and that the filler material used for the shielding gas welding process is comprised of a welding wire having a zinc and/or carbon and/or aluminum content. The advantage resides in that the use of a particular filler material in combination with a laser hybrid welding process renders feasible the production of a weld seam without inclusions, thus obtaining a tightness of the weld seam, on the one hand, and a high stability of the weld seam, on the other hand. Another advantage results from that the welding process is performed in a single operation so as to render weld seam finishing superfluous. Thus, no additional welding process, for instance a manual welding process, need be carried out after welding in order to ensure the appropriate stability and tight-ness, as is the case in the prior art. Hence result substantial time savings and accordingly reduced costs. Yet, it is also advantageous that the sheet metals to be welded need not be pretreated, because no so-called evaporation gap has to be provided beforehand and the sheet metals are merely held one above the other in the unworked state, which will again provide time and cost savings in a simple manner. It will also enable a fully automated welding operation of sheet metals or structural components, as is, for instance, desired in the motorcar industry.

A measure by which the sheet metals comprise a zinc coating and a welding wire preferably comprising the components zinc, carbon and aluminum, or a filling wire designated SAF DUAL ZN®, is used, is advantageous, because the welding wire will thereby harmonize with the sheet metal, in particular with the coating of the sheet metal, and hence bind the vapors emerging from the coating into the weld seam without forming any inclusions so as to produce a tight weld seam in a single operating step without any finishing operation.

The sheet metals are advantageously superimposed and pressed against each other by a clamping device so as to ensure the precise and firm positioning of the sheet metals within the clamping device prior to welding such that the welding process can be readily performed after the positioning and clamping of the sheet metals without, for instance, one of the sheet metals slipping and, hence, affecting the welding result.

A measure by which a MIG/MAG welding process is employed as said shielding gas welding process is of advantage, since it enables the use of a cheap welding torch known from the prior art in combination with the laser unit or laser. When using a MIG/MAG welding process, a welding process well suited to introduce or supply a filler material or welding wire is employed such that excellent welding results will be achieved.

A measure through which the MIG/MAG welding process is formed by a cold-metal transfer welding process including a forward/rearward movement of the welding wire is also advantageous, wherein the energy input via the shielding gas welding process is reduced because of the droplet detachment being effected by the rearward movement of the welding wire, which enables the formation of a very narrow weld seam. Another advantage resides in that the reduced heat input ensures a substantially minimized distortion of the sheet metals.

The measure of adapting the energy of the laser process to the sheet metal thickness and/or welding requirements offers the advantage of the laser process using only the energy required for the welding procedure, so that no unnecessary energy will be lost.

Of advantage is a measure by which the laser process is adjusted in a manner that the focus of the laser is located on the surface of the first sheet metal, viewed from the laser. This enables the laser, or the energy or intensity of the laser, to be focussed on the surface of the sheet metal and, hence, used on the welding site where the highest energy is required for melting the sheet metal.

A measure by which the shielding gas welding process is activated or deactivated simultaneously with, or subsequently to, the laser process, is advantageous because thereby the start of the shielding gas welding method to the laser process will be readily controlled and the shielding gas welding process will not be unintentionally and/or uncontrolledly started before or after the laser process. Thus, a certain security is additionally provided in a simple manner and the risk of injury as well as the risk of destruction by an inadvertent ignition of the laser and/or shielding gas welding process will be avoided.

The object according to the invention is, however, also achieved in that the focus of the laser, at the start of the laser process, is adjusted at a defined distance relative to the surface of the first sheet metal, viewed from the laser, and that the laser performs a preadjustable longitudinal movement in the direction of the shielding gas unit and, subsequently, back to the starting position, wherein, during the forward/rearward movement of the laser, the laser power is controlled in a manner that at least the coatings of the sheet metals are evaporated or melted and, hence, the surface of the first sheet metal, viewed from the laser, is freed of impurities and/or coatings by the laser. This offers the advantage that the ignition procedure of the shielding gas welding process following the laser is substantially facilitated and enhanced. It is, in fact, achieved because, due to the movement of the laser and the melting off, or evaporation, of impurities from the sheet metal surface, an electrically perfectly conductive trace is created such that, at a consecutive ignition of the electric arc, a stable and safe ignition will be feasible in this area. Hence, no pre-cleaning of the sheet metals need be carried out.

Yet, also of advantageous is a measure by which, after the starting phase, i.e. after the forward/rearward movement of the laser, the focus of the laser is altered to a distance adjusted or defined for the laser welding process, relative to the surface of the first sheet metal, viewed from the laser, since this will allow the full welding energy to be available for the laser hybrid welding process.

A measure by which, upon completion of the starting phase, the shielding gas welding process is started and the ignition of the electric arc is effected, and the laser power, simultaneously with or subsequently to the start of the shielding gas welding process, is altered to the preadjusted power for the welding process to be carried out subsequently is of advantage, since it avoids a delay between the starting process and the consecutive welding process, with the welding process being immediately carried out on the previously cleaned sheet metal. Hence, it is, for instance, no longer possible that contaminations will occur on the sheet metal to be welded.

Moreover, a measure is advantageous, by which the distance to be covered for the longitudinal movement in the starting phase is chosen as a function of a distance between the laser unit and the shielding gas unit such that the electric arc will be reliably ignited in the region of the melted sheet metal and said distance will amount to between 0 and 15 mm, preferably between 0 and 6 mm. This ensures the optimum travel and, hence, a reduced time period necessary for the starting phase. Another advantage resides in that it is, for instance, avoided that the electric arc is ignited in a region other than the cleaned region at too short a rearward movement.

A further measure, through which the movement of the laser hybrid welding torch is robot-controlled and effected via a robot, is advantageous since the routine for carrying out the starting phase need only be deposited in the control device of the robot or a welding apparatus so as to enable the robot to automatically perform any movement of the laser hybrid welding head.

Another measure, by which the sheet metals are superimposed and pressed against each other by the aid of a clamping device arranged on the welding head, and the clamping device is comprised of a roller and a clamping strap arranged on the laser hybrid welding torch, is of advantage, since thereby an external clamping device advantageous is no longer required. Another advantage resides in that the sheet metals, on account of the clamping device arranged on the laser hybrid welding head, are pressed against each other merely in the immediate region of welding such that, particularly in the welding region, no or almost no gap will be present between the sheet metals.

In an advantageous manner, the laser unit is comprised of an eximer laser (e.g. ArF, KrF, XeCl), a solid state-type laser (e.g. ruby, Nd:YAG, Nd-glass), a semiconductor-type laser (GaAs, GaAlAs) or a gas laser ($CO_2$), since this will provide a simple and cost-effective laser hybrid welding head.

BRIEF DESCRIPTION OF THE DRAWINGS

The present invention will be explained in more detail by way of the accompanying drawings. Therein:

FIG. 4 is a sectional and simplified, schematic illustration of a fillet weld;

FIG. 5 is a sectional and simplified, schematic illustration of an I-weld welded by means of a laser;

FIG. 6 is a sectional and simplified, schematic illustration of an I-weld welded by a laser hybrid welding method;

FIG. 7 illustrates the starting phase; and

FIG. 8 is a simplified, schematic illustration of the start of the laser hybrid welding process.

DETAILED DESCRIPTION

Figure 1:
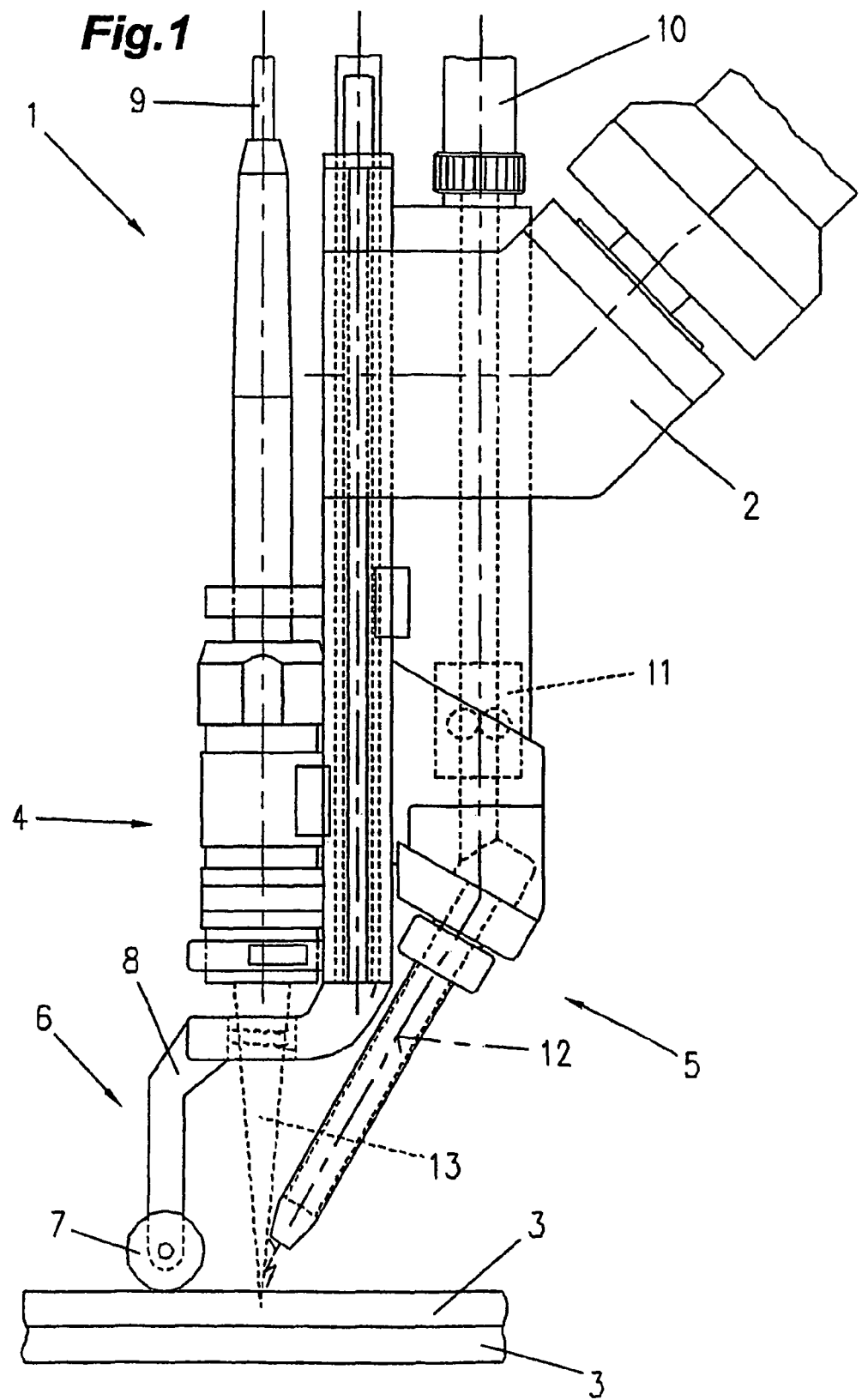
FIG. 1 is a schematic illustration of a laser hybrid welding head.

FIG. 1 is a simplified, schematic illustration of a laser hybrid welding head 1, or laser hybrid welding torch, according to the invention, which is, for instance, arranged on a robot arm 2 and used for welding coated sheet metals 3 as are used in the motorcar industry. In a preferred manner, the sheet metals 3 comprise zinc coatings. The laser hybrid welding head 1 is comprised of at least one laser unit 4 and at least one shielding gas unit 5.

The sheet metals 3 are held relative to each other in the unworked or unprepared state. This means that, for the welding of the sheet metals 3, no special preparation or processing operation for the weld seam is required in order to, for instance, carry off escaping zinc vapors as is known from the prior art. The sheet metals 3 are simply superimposed without, for instance, forming a gasification gap for the zinc between the sheet metals 3 as is known from the prior art. Thus, substantial time and cost savings are achieved in a simple manner already when making the sheet metals 3 ready for welding.

So the sheet metals 3 are superimposed and arranged in the correct welding position and, after this, held in this position, for instance, by the aid of clamping devices 6. In the exemplary embodiment illustrated, the clamping device 6 is formed by a roller 7, which is arranged on the laser hybrid welding head 1, pressing on the sheet metals 3 by a clamping strap 8 in the vicinity of the laser hybrid welding site. The laser hybrid welding head 1, after having been correctly positioned, is, thus, moved in the direction of the sheet metals 3 until contacting the clamping device 6, i.e. the roller 7. By the roller 7, the sheet metals 3 are pressed at each other in the welding zone so as to ensure the approximately gap-free positioning of the sheet metals 3 relative to each other, i.e., a gap of zero or almost zero mm between the sheet metals 3. Consequently, the sheet metals 3 are held against each other only in the zone of actual welding zone so as to substantially minimize the expenditures involved in making the sheet metals 3 ready for welding.

For the laser unit 4 of the laser hybrid welding head 1, any laser known from the prior art can be used, for instance an eximer laser (e.g., ArF, KrF, XeCl), a solid state-type laser (e.g. ruby, Nd:YAG, Nd-glass), a semiconductor-type laser (GaAs, GaAlAs) or a gas laser ($CO_2$). The shielding arc unit 5 is comprised of a MIG/MAG welding torch for a MIG/MAG welding process. Naturally, the laser process may, for instance, also be combined with a so-called cold-metal transfer welding process as described in more detail in one of the Figures below.

The laser hybrid welding head 1 in a preferred manner is arranged on the robot arm 2 of a welding robot as employed in the motorcar industry, where the sheet metals 3 or structural components to be welded in the rarest cases are two-dimensionally designed. With conventional welding processes for zinc-coated sheet metals 3, it has not been possible to meet the users' demands by welding robot welding, calling for further, manual welding after the laser welding process with the welding robot to ensure the necessary stability and/or tightness of the weld. A substantial advantage, therefore, consists in that the method according to the invention enables welding in one operating step while achieving a high strength and tightness of the weld seam.

The laser hybrid welding head 1, or the laser unit 4 and the shielding gas unit 5, for instance, via two independent hose packs 9, 10 each respectively supplying at least one unit of the laser hybrid welding head 1 with the means necessary for the respective welding process, such as power and voltage, cooling fluid, welding wire feed etc., are connected with a welding device and/or a power source and/or a wire storage means, which are not shown in the illustrated embodiment. The shielding gas unit 5 further comprises a wire feeder 11 for conveying a filler material and, in particular, a welding wire 12 in the direction of the sheet metals 3. Preferably, the filler material or the welding wire 12 comprises the components zinc and carbon and aluminum. Advantageously, a filling wire designated SAF DUAL ZN® is used as said welding wire 12. Naturally, it is also possible to use a welding wire 12 with similar filler materials.

What is essential in the method according to the invention is the use of a special filler material or welding wire 12 in the welding of zinc-coated sheet metals 3 so as to prevent the zinc evaporating from the sheet metals 3 during the welding process from affecting the weld 12. This will preferably be achieved by using a welding wire 12 designated SAF DUAL ZN®. To this end, it is essential that the energy input via the shielding gas welding process be kept as low as possible in order to reach as slight a distortion as possible as well as good mechanico-technological properties.

During the welding process, the sheet metals 3 are melted open or melted through by the laser 13 while dissolving or evaporating the zinc coating of the sheet metals 3. In the consecutive shielding gas welding process, the laser weld or laser trace will then be filled or closed by introducing filler material so as to weld the sheet metals 3 tightly together.

In the following, parameters and/or settings will be described to illustrate the application of the method. They will, however, only refer to a special application variant, which can be modified for other applications and, in particular, other sheet metals.

With two-sheet joints, for instance, very good welding results will, in particular, be obtained with a fillet weld in the lap joint or a butt seam or a stitch seam in the lap joint, the sheet metal connections being realized between 0.5 and 2 mm on electrolytically zinc-coated and hot-galvanized sheet metals. A focus diameter of 0.4 to 1.4 mm is chosen, with the distance between the focus and the impingement of the filler material (welding process distance) ranging between 0 and 5 mm. The laser power $P_L$ amounts to between 3 and 4 kW. The settings at the power source of the shielding gas unit can be as follows:

$v_D$ (welding wire transport speed)=1 to 10 m/min;
$d_D$ (welding wire diameter)=1.0 to 1.2 mm;
I (welding current)=between 40 and 260 A.

Both two-component gases and three-component gases may be used for these applications. A two-component gas may, for instance, be composed of 96% Ar, 4% $O_2$, or a three-component gas like, e.g., DIN EN 439-M14 (82 vol. % Ar+14 vol. % $CO_2$+4 vol. % $O_2$) with deviations of ±3%.

For sheet metals 3 mostly used in the motorcar industry, an adjustment of the welding process may, for instance, be effected as explained in the two Examples 1 and 2 (wherein $v_s$ indicates the welding speed, $v_D$ the wire transport speed, I the welding current, U the welding voltage and $P_L$ the laser power):

Example 1

Electrolytic zinc coating ZE75/75 according to EN 10152
Stitch seam in the lap joint:
Welding wire: SAF DUAL ZN®
$v_s$: 3 m/min
I: 50 A
$v_D$: 1.6 m/min
U: 12.2 V
Distance: 2 mm
$P_L$: 3.9 kW
Focus diameter: 0.8 mm

Example 2

Z 100 galvanized zinc coating: zinc layer thickness: 7.5 μm
Butt seam
Welding wire: SAF DUAL ZN®
$v_s$: 2.4 m/min
I: 50 A
$v_D$: 1.6 m/min
U: 12.2 V
Distance: 2 mm
$P_L$: 3.9 kW
Focus diameter: 0.8 mm By this, very good and, above all, tight weld seams are obtained, which can be produced in one operating step, i.e. in a single welding process via the laser hybrid welding process, without requiring weld seam finishing. It goes without saying that the same welding results will be achieved even after a change of one or several of said parameters. When, for instance, changing cooperating parameters like, e.g., the welding wire transport speed ($v_D$), welding current amplitude (I) etc., the same good welding quality will again be obtained such that the settings can only be regarded as guide points. It is, further-more, possible to deposit suitable routines in a memory of the welding apparatus so as to enable the automatic adjustment of the unit. When, for instance, changing one of the parameters of the unit, the remaining parameters will be determined and set automatically with a view to again reaching the optimum welding results possible.

Figure 2:
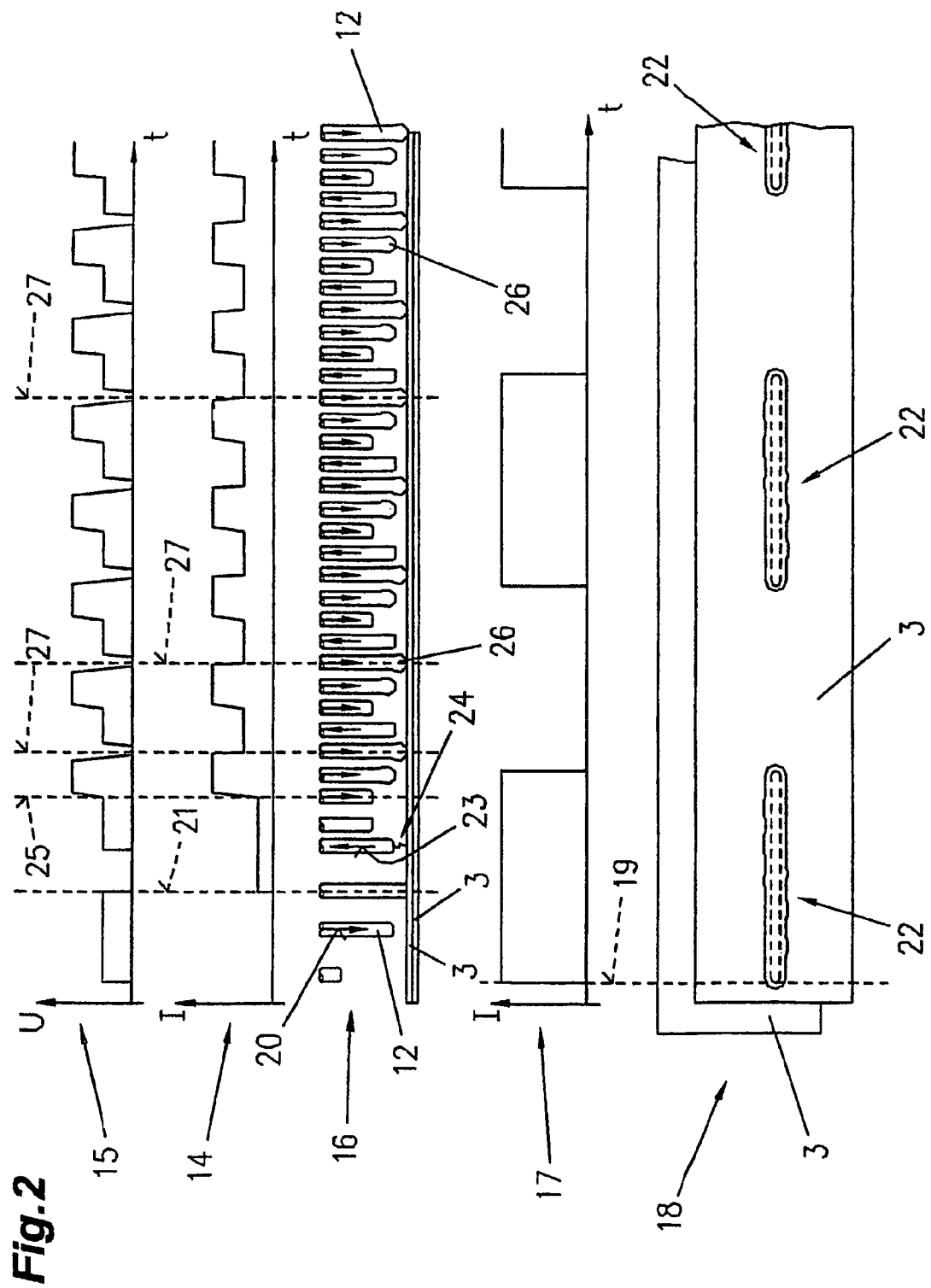
FIG. 2 depicts current, voltage and movement diagrams of a cold-metal transfer welding process and a current-time diagram of a laser process, as well as a top view on the welded sheet metals in a simplified illustration.

FIG. 2, by way of a current-time diagram 14, a voltage-time diagram 15 and a motion-time diagram 16, schematically illustrates in a simplified fashion the time behavior of the shielding gas welding process and, in particular, a cold-metal transfer welding process. Moreover, the combined laser process is illustrated in a separate current-time diagram 17, and a top view on the sheet metals 3 to be welded, or welded, is given for clarification at 18. The diagrams of the shielding gas welding process are not in scale with the current-time diagram 17 of the laser 13 and the top view 18 on the sheet metals 3. The diagrams merely serve to illustrate the course or time sequence of the shielding gas welding process for part of a weld seam 22, whereas for the laser process a representation of the time behavior for the formation of the weld seams 22 on the sheet metals 3 is given.

At the start of the laser hybrid welding process, the laser 13 is activated by the laser unit 4 at time 19 to melt, or melt through, the sheet metals 3 while evaporating the zinc coating of the sheet metals 3. The shielding gas unit 5 is arranged in the close vicinity of the laser 13, i.e. immediately downstream of the laser 13—viewed in the welding direction. Upon ignition of the laser 13, or simultaneously with the activation of the laser 13, the starting phase for the ignition of the electric arc in the shielding gas welding process is carried out by moving the welding wire 12 at time 21 in the direction of the workpiece, i.e. sheet metals 3, in the sense of arrow 20 until contacting the same. At a contact of the welding wire 12 with the sheet metals 3, a short-circuit is caused. After this, an increase in the current I is effected in a manner as to prevent the fusion of the welding wire 12. An electric arc 24 is ignited due to the subsequent retraction of the welding wire 12 in the sense of arrow 23. Such an ignition or starting phase for the electric arc 24 is also referred to as lift-arc ignition.

At time 25, the ignition or starting phase for the electric arc 24 of the shielding gas welding process is completed and an increase in the current I and, at the same time, a forward movement of the welding wire 12 in the direction of the sheet metals 3 take place. The current increase causes the formation of a droplet 26 on the end of the welding wire 12, which detaches at time 27 at a new contact of the welding wire 12 with the sheet metals 3, or melt bath formed by the electric arc 24, and the subsequent rearward movement of the welding wire 12. During the shielding gas welding process, the welding wire 12 performs a continuous forward/backward movement. Since the detachment of the welding droplet 26 takes place without a current increase, little energy and, in particular, thermal energy is introduced into the sheet metals 3 by this process.

In the shielding gas welding process, the cold-metal transfer process may, of course, also be combined with any other known welding process, in particular a pulse welding process, such that a cold-metal transfer process will alternate with a pulsed process.

As already pointed out, the sheet metals 3 are melted, or melted through, by the laser 13 and, furthermore, the zinc coating of the sheet metals 3 is dissolved and evaporated. In the subsequent shielding gas welding process, the laser weld or laser trace is being filled and closed by introducing a filler material. The filler material is supplied at as low an energy input as possible, since the droplet transition takes place in the short-circuit without current increase such that the sheet metals 3 are again tightly welded with each other. By this special filler material introduction via the cold-metal transfer process, it is reached that the welding bead can be kept very narrow in terms of width, since the shielding gas welding process only causes slight additional melting of the sheet metals 3.

At a delayed start of the shielding gas welding process, a parameter can be adjusted in the welding apparatus or in the control device of the welding apparatus. The control device calculates the time delay from the input distance between the laser unit 4 and the shielding gas unit 5 and the defined welding speed, thus automatically activating and deactivating the shielding gas welding process to the laser 13.

Figure 3:
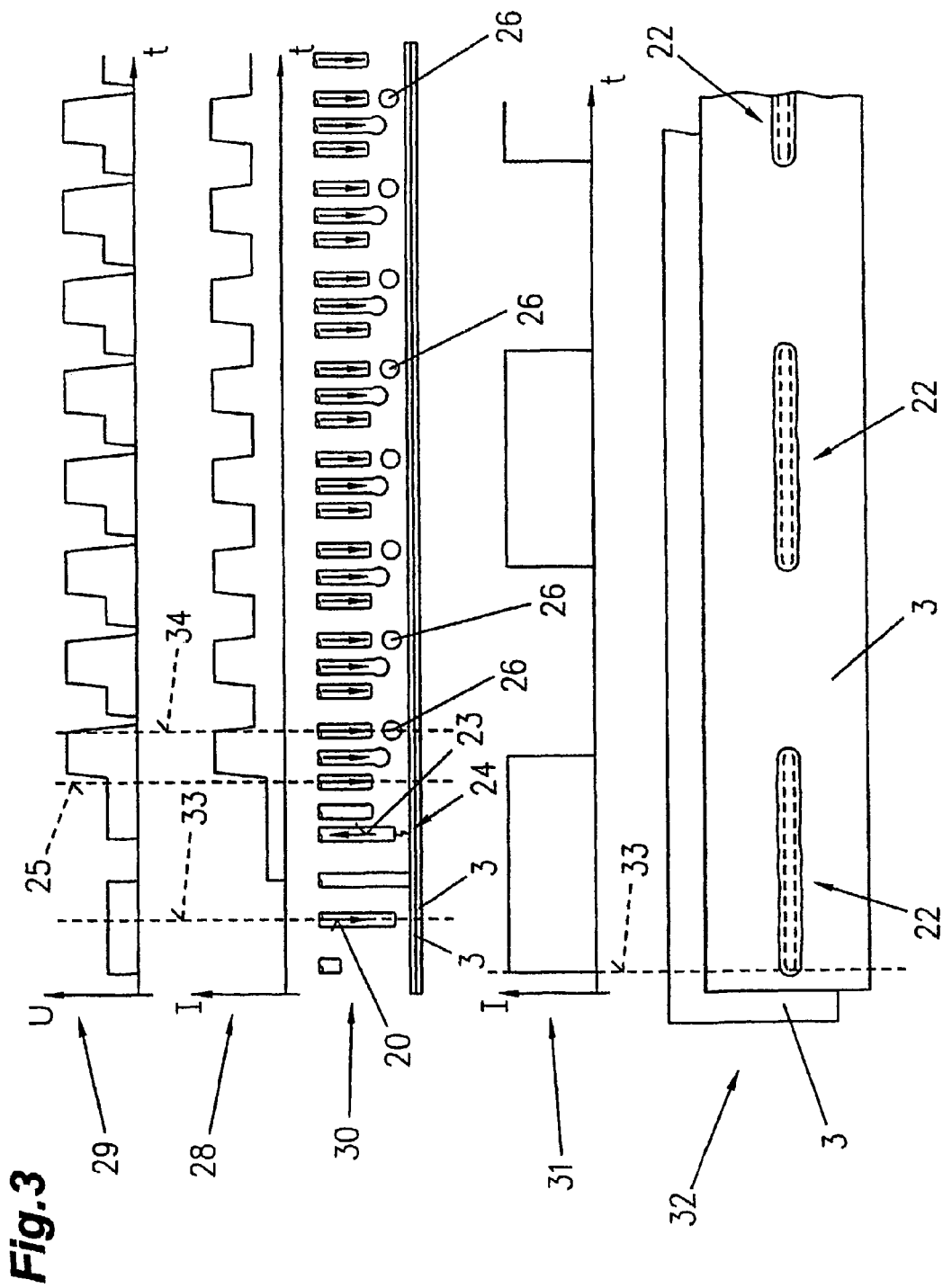
FIG. 3 depicts current, voltage and movement diagrams of a pulse welding process and a current-time diagram of a laser process, as well as a top view on the welded sheet metals in a simplified, schematic illustration.

FIG. 3 illustrates an exemplary embodiment of a laser hybrid process using a laser 13 and a pulse welding process, now showing in a simplified and schematic view the time history of the shielding gas welding process, in particular a pulse welding process, by way of a current-time diagram 28, a voltage-time diagram 29 and a motion-time diagram 30. In addition, the laser process is illustrated by way of a current-time diagram 31, and a top view 32 on the sheet metals 3 to be welded, or welded, is given for clarification. Again, the diagrams of the shielding gas welding process are not in scale with the current-time diagram 31 of the laser 13 and the top view 32 on the sheet metals 3, merely depicting the course or time sequence of the shielding gas welding process for part of a weld seam 22, whereas for the laser process a representation of the time behavior for the formation of the weld seams 22 on the sheet metals 3 is illustrated.

At time 33, the laser 13 is activated to melt, or melt through, the sheet metals 3 while evaporating the zinc coating of the sheet metals 3. Upon ignition of the laser 13, or simultaneously with the start of the laser 13, the ignition or starting phase of the shielding gas welding process is carried out by moving the welding wire 12 at time 34 in the direction of the workpiece, i.e. sheet metals 3, in the sense of arrow 20 until contacting the same. At a contact of the welding wire 12 with the sheet metals 3, a short-circuit is caused, with an increase in the current I being effected in a manner as to prevent the fusion of the welding wire 12. Due to the subsequent retraction of the welding wire 12 in the sense of arrow 23, the electric arc 24 is ignited with the welding wire 12 being moved into a defined starting position. The ignition or starting phase for the shielding gas welding process has, thus, been completed. As already mentioned, this ignition or starting phase is also referred to as lift-arc ignition. At time 25, i.e. after the ignition or starting phase, an increase in the current I and, at the same time, a continuous forward movement of the welding wire 12 in the direction of the sheet metals 3 take place. On the end of the welding wire 12 is formed a droplet 26, which detaches from the welding wire 12 at time 34, it being, for instance, feasible to use a current pulse to initiate said detachment. By lowering the current I and increasing it again, another droplet 26 is formed and sequentially detached from the welding wire 12.

FIGS. 4 to 6, in simplified schematic illustrations, depict different weld seam shapes in sectional side views, FIG. 5 illustrating a weld seam produced by a conventional welding method. Naturally, any seam shapes known in welding technology can be produced by the welding method according to the invention, yet only two different seam shapes are elucidated in the description, since the other seam shapes can be deducted from this description.

FIG. 4 is a section through a fillet weld 35 in a simplified illustration. The sheet metals 3 are arranged to overlap in a gap-free or approximately gap-free manner. The laser 13 is directed onto a point of intersection 36 of the sheet metals 3. The laser energy or intensity and the shielding gas welding parameters are functions of the sheet metals 3 to be welded and can, for instance, be adjusted by a user on a laser current source and on the welding apparatus or control device of the welding apparatus. The laser 13 realizes a penetration into the sheet metals 3, whereupon the shielding gas welding process following the laser process 13, by the aid of a filler material, i.e. the welding wire 12, draws a weld seam 37 in the form of a fillet weld 35 over the sheet metals 3, thus completely closing the laser penetration. For the sake of clarity, the laser 13 and the welding wire 12 are entered in broken lines. The advantage consists in that the employed welding wire 12 has a zinc content, which binds the zinc coating of the sheet metals 3 such that no zinc can "accumulate". In the prior art welding methods used for zinc-coated sheet metals 3, the zinc is "pushed on" by the laser 13 and/or the shielding gas welding method, thus forming zinc cushions which can then literally explode. This may induce the formation of inclusions or holes or craters in the weld seam 37, which will subsequently have to be reworked in a separate welding procedure in order to create a tight weld seam. By contrast, the method according to the invention provides a stable, or stabler, and tight weld seam 37 by the binding of the zinc. No inclusions, holes or craters are, thus, formed in the weld seam 37, and a tight weld seam is, thus, created in a single operation.

FIG. 5 depicts an exemplary embodiment from the prior art, in which an I-seam 38 welded solely by a laser welding process is sectionally illustrated in a simplified manner. The laser 13, or focus of the laser 13, is preferably directed onto an upper edge 39 or surface of the overlying sheet metal 3. In the exemplary embodiment illustrated, only the laser 13 is used, as is usually the case. Due to the zinc coating of the sheet metals 3, a zinc cushion is formed during laser welding in front of the laser 13, through which inclusions 40, holes and craters are formed in the weld seam 37. The quality of the weld seam 37 is, thus, substantially influenced, particularly deteriorated.

FIG. 6 illustrates an I-seam 38 welded by the laser hybrid welding method according to the invention. The laser 13, as extensively described, is leading, with the focus of the laser 13 being preferably located on the surface 39 of the first sheet metal 3. The sheet metals 3 are melted open or melted through by the laser 13 and the subsequent shielding gas welding process lays an inclusion-free weld seam 37 over the same. This is achieved in that the filler materials of the welding wire 12 cooperate with the coat of the sheet metals 3, or melt bath, in an advantageous manner. This enables the formation of a substantially improved weld seam 37, wherein a stable and tight weld seam 37 is ensured in a single operating step.

FIGS. 7 and 8 depict a starting phase and the start for the laser hybrid welding process in schematic and simplified illustrations. Performed are at least one laser process by the aid of the laser 13 and a shielding gas welding process using, in particular, a MIG/MAG shielding gas unit 5. The laser 13 precedes the shielding gas welding process, wherein the shielding gas welding process is positioned in the vicinity of the laser 13. A filler material and/or welding wire 12 is supplied to a welding site via the shielding gas welding process.

When starting the laser process with the laser hybrid welding head 1 being in its starting position 46, the focus 47 of the laser 13 is adjusted at a defined distance 42 relative to the surface 41 of the sheet metal 3, whereupon the laser 13 performs a preadjustable longitudinal movement 44 in the direction of the shielding gas unit 5, i.e. as far as to a reversing position 48, and subsequently back to the starting position 46. During the forward/rearward movement of the laser 13, i.e. during the longitudinal movement 44 as schematically indicated by a double arrow, the laser power is controlled in a manner that a coating 45 of the sheet metal 3 is evaporated or melted, thus freeing the surface 41 of the overlying sheet metal 3 of impurities and/or coatings by the laser 13.

In an advantageous manner, the distance 42 of the focus 47 from the sheet metal 3 is chosen such that the laser 13 will form as wide a trace as possible on the sheet metal 3, said trace subsequently serving the shielding gas welding process as an ignition surface 43, as will be explained in more detail below. At a small distance 42, or arrangement of the focus 47 on the surface 41 of the sheet metal 3, a narrow laser trace will be created, whereas, with a larger distance 42 relative to the surface 41 of the sheet metal 3, a wider laser trace or ignition surface 43 will be reached. It is, however, to be safeguarded that the focus 47 be chosen such that a melting or evaporation of at least the coating 45 will occur.

Upon activation of the laser 13, the laser hybrid welding head 1 performs a preadjustable longitudinal movement 44 in the direction of the shielding gas unit 5 and, subsequently, back to the starting position 46, wherein the laser hybrid welding head 1, in particular the laser 13 and the shielding gas unit 5, for the sake of clarity are illustrated in broken lines in the starting position and in dot-and-dash lines in the end position of the cleaning method. The laser 13 during the longitudinal movement 44 covers a preadjusted or preadjustable distance 49. The distance 49 is chosen as a function of a distance 50 between the laser 13 and the shielding gas unit 5 such that, at a subsequent ignition of an electric arc 24, during which the laser hybrid welding head 1 is in its starting position 46, the former will be ignited in the region of the melted sheet metal 3, i.e. of the ignition surface 43. The laser 13, or laser hybrid welding head 1, thus at least performs a longitudinal movement 44 as far as to the shielding gas unit 5. In order to ensure the safe ignition of the shielding gas welding process, the longitudinal movement 44 can also be performed farther than to the shielding gas unit 5. In doing so, it is ensured that, at an ignition, the electric arc 24 will be ignited in the region of the provided ignition surface 43.

When the starting phase is completed, with the laser hybrid welding head 1 in its starting position 46, the welding process is started. The laser process and the shielding gas welding process are, for instance, simultaneously or consecutively initiated. The ignition of the electric arc 24 takes place on the ignition surface 43 prepared by the laser 13. The distance 50 between the laser process and the welding process preferably is between 0 and 15 mm, preferably between 0 and 6 mm. In this case, it is possible either simultaneously with, or subsequently to the start of the shielding gas welding process, to change the laser power to the preadjusted laser power for the welding process to be carried out subsequently.

The movement of the laser hybrid welding torch 1 can be effected via a robot. This starting phase may, of course, also be applied to a manually guided laser hybrid torch, in which case the user will at first carry out the longitudinal movement 44 with the laser process alone and only subsequently position the manually guided laser hybrid torch above the created ignition surface 43 so as to allow the initiation of the actual welding process.

Accordingly, while a few embodiments of the present invention have been shown and described, it is to be understood that many changes and modifications may be made thereunto without departing from the spirit and scope of the invention as defined in the appended claims.

The invention claimed is:

1. A method for welding using a laser hybrid welding process, comprising the steps of:
   performing at least one laser process;
   calculating a time for a delay of a start of at least one shielding gas welding process;
   delaying the start of said at least one shielding gas welding process by calculating the time for delay based upon an input distance between a laser unit and a shielding gas unit, and a defined welding speed;
   performing said at least one shielding gas welding process comprising a MIG/MAG welding process which is formed by a cold-metal transfer welding process including a forward/rearward movement of a welding wire,
   increasing a current in said welding wire during said forward movement;
   causing a droplet to be released;
   wherein an energy input via the shielding gas welding process is reduced because of the droplet detachment being effected by the rearward movement of the welding wire;
   supplying a filler material to the welding site via the shielding gas welding process,
   positioning a set of coated sheet metals relative to each other in a gap-free manner, wherein said filler material used for the shielding gas welding process is comprised of a welding wire having at least one of a zinc carbon or aluminum content;
   superimposing and clamping said set of coated sheet metals together via a clamping device which is arranged on a welding head and wherein the clamping device is comprised of a roller and a clamping strap.

2. The method according to claim 1, wherein the welding wire comprises the components zinc, carbon and aluminum.

3. The method according to claim 1, wherein the energy of the laser process is adapted to at least one of the sheet metal thickness and the welding requirements.

4. The method according to claim 1, wherein the laser process is adjusted in a manner that the focus of the laser is located on the surface of the first sheet metal, viewed from the laser.

5. The method according to claim 1, wherein the shielding gas welding process is activated or deactivated simultaneously with, or subsequently to, the laser process.

6. A method for starting a laser hybrid welding process, comprising the steps of:
   performing—at least one laser process;
   performing at least one shielding gas welding process with the laser process preceding the shielding gas welding process, and wherein the shielding gas welding process is positioned in a vicinity of a laser;
   supplying a filler material to the welding site via the shielding gas welding process,
   adjusting a focus of the laser, at the start of the laser process, at a defined distance relative to the surface of the first sheet metal, viewed from the laser,
   performing using the laser a preadjustable longitudinal movement in a direction of the shielding gas unit and, subsequently, back to the starting position,
   increasing a current in the welding wire during the longitudinal movement in a direction of the shielding gas unit;
   wherein, during the forward/rearward movement of the laser, the laser power is controlled in a manner that at least a set of coatings of sheet metals are evaporated or melted and, hence, the surface of a first sheet metal, viewed from the laser, is freed of impurities or coatings by the laser, wherein said step of said shielding gas welding process is delayed from starting by a time based upon an input distance between a laser unit and a shielding gas unit, and a defined welding speed.

7. A method according to claim 6, further comprising the step of:
   altering the distance of the focus of the laser wherein the distance is adjusted or defined for the laser welding process, relative to the surface of the first sheet metal—viewed from the laser.

8. A method according to claim 6, wherein the shielding gas welding process is started, and the ignition of the electric arc is effected, upon completion of the forward/rearward movement.

9. A method according to claim 8, wherein the laser power, simultaneously with or subsequently to the start of the shielding gas welding process, is altered to the preadjusted power for the welding process to be carried out subsequently.

10. A method according to claim 6, wherein the distance to be covered for the longitudinal movement in the forward/rearward movement step is chosen as a function of a distance between the laser and the shielding gas unit such that the electric arc is ignited in the region of the sheet metal melted by the laser.

11. A method according to claim 10, wherein said distance amounts to between 0 and 15 mm, preferably between 0 and 6 mm.

12. A method according to claim 6, wherein the movement of the laser hybrid welding torch is robot-controlled.

13. A laser hybrid welding torch for welding coated sheet metals or structural components, comprising:
   at least one laser or laser optics;
   at least one shielding gas unit wherein said shielding gas unit comprises a MIG/MAG welding torch configured to perform a cold metal welding transfer via a shielding gas welding process;
   a wire feeder for a filler material or welding wire;
   a clamping device for the gap-free positioning of the coated sheet metals or structural components, and that a material having the following components: zinc; carbon, and aluminum content is used as said filler material or welding wire;
   at least one control device configured to calculate a time delay to delay a start of the shielding gas welding process;
   wherein said control device is configured to calculate a time for the delay of the start of the shielding gas welding process based upon an input distance between the laser and the shielding gas unit, and a defined welding speed.

14. A laser hybrid welding torch according to claim 13, wherein the sheet metals are formed with a zinc coating.

15. A laser hybrid welding torch according to claim 13, wherein that the clamping device is comprised of an external clamping device.

16. A laser hybrid welding torch according to claim 13, wherein the laser is comprised of at least one of an excimer laser; a solid state-type laser; a semiconductor-type laser or a gas laser.

17. A laser hybrid welding torch according to claim 13, wherein the shielding gas unit is comprised of a MIG/MAG welding torch.

18. The laser hybrid welding torch as in claim 1, wherein said control device is configured to control and perform the following steps:
   performing at least one laser process;
   calculating a time for a delay of a start of at least one shielding gas welding process;
   delaying the start of said at least one shielding gas welding process by calculating the time for delay based upon an input distance between said laser unit and said shielding gas unit, and a defined welding speed;
   performing said at least one shielding gas welding process comprising a MIG/MAG welding process which is formed by a cold-metal transfer welding process including a forward/rearward movement of said welding wire,
   increasing a current in said welding wire during said forward movement;
   causing a droplet to be released;
   wherein an energy input via the shielding gas welding process is reduced because of the droplet detachment being effected by the rearward movement of the welding wire;
   supplying a filler material to the welding site via the shielding gas welding process,
   positioning a set of coated sheet metals relative to each other in a gap-free manner, wherein said filler material used for the shielding gas welding process is comprised of said welding wire having at least one of a zinc carbon or aluminum content;
   superimposing and clamping said set of coated sheet metals together via a clamping device which is arranged on a welding head and wherein the clamping device is comprised of a roller and a clamping strap.

19. The laser hybrid welding torch as in claim 13, wherein said clamping device is configured to perform a rearward movement of the welding wire.

20. The process as in claim 1, further comprising the step of providing a filler material with as little energy as possible wherein a droplet transition occurs in a short circuit without current increase to weld said sheet metals together.

21. The process as in claim 20, providing a welding bead within a substantially narrow width.

\* \* \* \* \*